(12) United States Patent
Eden

(10) Patent No.: US 9,127,207 B2
(45) Date of Patent: Sep. 8, 2015

(54) PYROLYSER

(75) Inventor: Robert D. Eden, Warwickshire (GB)

(73) Assignee: Process Limited, Coventry, West Midlands (GB)

( * ) Notice: Subject to any disclaimer, the term of this patent is extended or adjusted under 35 U.S.C. 154(b) by 643 days.

(21) Appl. No.: 13/383,970

(22) PCT Filed: Jul. 13, 2010

(86) PCT No.: PCT/GB2010/001329
§ 371 (c)(1),
(2), (4) Date: Feb. 9, 2012

(87) PCT Pub. No.: WO2011/007125
PCT Pub. Date: Jan. 20, 2011

(65) Prior Publication Data
US 2012/0125757 A1  May 24, 2012

(30) Foreign Application Priority Data
Jul. 14, 2009  (GB) .................... 0912214.4

(51) Int. Cl.
*C10B 1/04* (2006.01)
*C10B 49/08* (2006.01)
(Continued)

(52) U.S. Cl.
CPC . *C10B 49/08* (2013.01); *C10B 1/04* (2013.01); *C10B 49/06* (2013.01); *C10B 53/02* (2013.01); *C10J 3/20* (2013.01); *C10J 3/34* (2013.01); *C10J 3/485* (2013.01); *C10J 3/84* (2013.01); *C10K 1/04* (2013.01); *C10J 2200/158* (2013.01);
(Continued)

(58) Field of Classification Search
CPC .................... C10B 1/04; C10B 49/02–49/10
USPC ......... 201/1, 27, 29, 34, 37; 202/99, 120, 151
See application file for complete search history.

(56) References Cited

U.S. PATENT DOCUMENTS 3,971,704 A * 7/1976 von Klenck et al. ........... 201/2.5
3,997,407 A * 12/1976 Fujii et al. ..................... 202/221
(Continued)

FOREIGN PATENT DOCUMENTS

CN  1470615 A  1/2004
DE  3346105 A1  7/1985
(Continued)

OTHER PUBLICATIONS

Patent Abstracts of Japan, Publication No. 2001214170 A, "Waste-Carbonizing Furnace", So Yuichi, published Jul. 8, 2001.
(Continued)

*Primary Examiner* — In Sul Bullock
*Assistant Examiner* — Jonathan Miller
(74) *Attorney, Agent, or Firm* — Andrus Intellectual Property Law, LLP

(57) ABSTRACT

Described is a pyrolysis system including an entrained flow pyrolyzer having an opening through which biomass can be added. The pyrolyzer also has an inlet for hot exhaust gas, an outlet for pyrolyzed biomass and an outlet for syngas. The system has a burner for producing hot exhaust gas and a conduit between the burner and the hot exhaust gas inlet. A syngas extraction means for extracting syngas from the pyrolyzer. The syngas extraction means extracts syngas from the pyrolyzer at a rate such that the internal pressure within the pyrolyzer never exceeds the pressure external to the pyrolyzer.

12 Claims, 3 Drawing Sheets

(51) Int. Cl.
*C10B 49/06* (2006.01)
*C10B 53/02* (2006.01)
*C10J 3/20* (2006.01)
*C10J 3/34* (2006.01)
*C10J 3/48* (2006.01)
*C10J 3/84* (2006.01)
*C10K 1/04* (2006.01)

(52) U.S. Cl.
CPC .... *C10J 2300/092* (2013.01); *C10J 2300/0916* (2013.01); *C10J 2300/1253* (2013.01); *C10J 2300/165* (2013.01); *C10J 2300/1671* (2013.01); *Y02E 50/14* (2013.01)

(56) References Cited

U.S. PATENT DOCUMENTS

| | | | | |
|---|---|---|---|---|
| 4,225,392 | A * | 9/1980 | Taylor | 202/93 |
| 4,412,889 | A * | 11/1983 | Oeck | 202/117 |
| 4,601,811 | A * | 7/1986 | Lewis et al. | 208/410 |
| 4,619,738 | A * | 10/1986 | Lewis et al. | 202/85 |
| 5,401,364 | A * | 3/1995 | Rinker | 201/1 |
| 5,605,551 | A * | 2/1997 | Scott et al. | 44/307 |
| 7,241,322 | B2 * | 7/2007 | Graham | 48/111 |
| 7,677,185 | B2 * | 3/2010 | Simon | 110/250 |
| 7,736,469 | B2 * | 6/2010 | Taylor | 201/25 |
| 7,785,447 | B2 * | 8/2010 | Eatough et al. | 201/6 |
| 8,001,912 | B2 * | 8/2011 | Graham | 110/342 |
| 8,276,289 | B2 * | 10/2012 | Causer | 34/90 |
| 8,322,056 | B2 * | 12/2012 | Causer | 34/90 |
| 8,549,769 | B2 * | 10/2013 | Weisselberg et al. | 34/417 |
| 2004/0024279 | A1 * | 2/2004 | Mason | 588/226 |
| 2006/0163053 | A1 * | 7/2006 | Ershag | 201/13 |
| 2011/0239620 | A1 * | 10/2011 | Pashkin | 60/39.12 |
| 2011/0290633 | A1 * | 12/2011 | de Melo et al. | 202/124 |
| 2012/0261245 | A1 * | 10/2012 | Breneman | 201/20 |

FOREIGN PATENT DOCUMENTS

| | | |
|---|---|---|
| DE | 3733078 A1 | 4/1989 |
| EP | 0 630 957 A1 | 12/1994 |
| EP | 1 580 253 | 9/2005 |
| WO | 99/25792 A1 | 5/1999 |
| WO | 99/50374 A1 | 10/1999 |
| WO | 2007102032 | 9/2007 |
| WO | 2007/113330 A1 | 10/2007 |
| WO | 2008044216 | 4/2008 |
| WO | 2008107727 | 9/2008 |

OTHER PUBLICATIONS

GB Search Report dated Nov. 4, 2009.
International Search Report dated Aug. 18, 2011.

* cited by examiner

PYROLYSER

CROSS-REFERENCE TO RELATED APPLICATIONS

This application claims priority to PCT/GB2010/001329, filed Jul. 13, 2010, which claims priority to UK Application No. 0912214.4, filed Jul. 14, 2009, incorporated herein by reference.

This invention relates to pyrolysers, in particular to pyrolysers for pyrolysing waste to produce syngas.

It is well known that pyrolysis of biomass, which can include waste materials containing biomass, can be used as a process to produce syngas (synthesis gas), which can then either be further processed. The production of syngas is often one step in waste to energy systems.

Typically, in waste to energy systems, waste containing biomass is pyrolysed in a pyrolyser and the syngas is then either combusted directly in a gas engine to produce energy, or alternatively can be further processed to produce synthetic natural gas.

There are several known problems with the current process. One known problem arises out of the fact that syngas, comprising mainly of carbon monoxide and hydrogen, is a dangerous substance. Not only is it highly flammable due to its hydrogen content but it is also highly toxic due to its carbon monoxide content. Accordingly, as gas is produced from the pyrolysis of biomass, pressure is generated in the pyrolyser and known pyrolysers are sealed systems to contain this pressurised gas. While sealing a pipe system for distributing the syngas downstream of the pyrolyser is not problematic, sealing large vessels into which biomass must be added through openings is problematic and leads to overly complex systems. Furthermore, as the pyrolysers run at high temperatures, standard sealing materials can not be used.

Another known problem with pyrolysers is that, typically, heat is applied to a drum or pipe through which the biomass passes. As heat is applied to the biomass indirectly through a surface thermal losses reduce the efficiency of the system.

A further problem associated with biomass pyrolysis, and in particular with waste to energy systems is that, depending on the biomass being pyrolysed the syngas produced will contain a varying amount of gaseous tar. While this is not problematic in the pyrolyser itself, in waste/biomass to energy systems wherein the syngas is combusted in a gas engine the cooling of the syngas in the engine, or in the pipelines leading to the engine, causes tar to condense out of the syngas where it is deposited on the interior surface of the engine/gas feed pipes. This is a serious problem which can badly damage gas engines. Although it is possible to overcome this by maintaining the pipes and engine at an elevated temperature this is a costly and energy inefficient process.

It is the purpose of the present invention to provide an improved pyrolyser, and biomass to energy system that at least partially mitigates some of the above problems.

According to a first aspect of the present invention there is provided a pyrolysis system comprising: an entrained flow pyrolyser having: an opening through which biomass can added; an inlet for hot exhaust gas; an outlet for pyrolysed biomass and an outlet for syngas; a burner for producing hot exhaust gas; a conduit between the burner and the hot exhaust gas inlet; a syngas extraction means for extracting syngas from the pyrolyser; wherein:

the syngas extraction means extracts syngas from the pyrolyser at a rate such that the internal pressure within the pyrolyser never exceeds the pressure external to the pyrolyser.

The invention therefore provides a pyrolysis system that overcomes the problems associated with high pressure syngas and obviates the necessity of providing a fully pressure sealed pyrolyser. Particularly beneficial of such a balanced pressure system is that the removal of the necessity to prevent pressure induced outflow of syngas via the pyrolysed biomass (hereinafter "char") outlet, or the biomass inlet. In a preferred system the syngas extraction means may extract syngas at a rate slightly higher than the rate that it is produced so as to maintain the pressure within the pyrolyser slightly below atmospheric pressure. In this manner a slight inflow of air is maintained so as to further reduce any danger of syngas escaping the system, although, so as to minimise oxygen entering the pyrolyser any inflow of air will preferably be minimised.

In a preferred arrangement the system further comprises: a flow path that conveys a proportion of the extracted syngas to the burner such that, in use, the burner combusts syngas produced in the pyrolyser to produce said hot exhaust gas. In this way the need for external fuel to heat the pyrolyser is minimised and, during use, the process becomes largely self sustaining.

Preferably the system further comprises an energy converter for combusting syngas and converting it to electrical energy. More preferably the energy converter is a gas engine.

It is preferred that the system further comprises a thermal oxidiser, in fluid communication with the syngas outlet, in which, in use, any excess syngas not combusted in the burner, or in the energy converter, is converted into inert gas.

The pyrolysis system preferably also comprises a cooling system for cooling the pyrolysed biomass to a temperature below which it will ignite upon exposure to oxygen.

Preferably the syngas extraction means comprises a variable speed pump, more preferably the syngas extraction means comprises a first variable speed pump for conveying syngas from the pyrolyser to the burner and a second variable speed pump for conveying syngas from the pyrolyser to the energy converter.

In a preferred arrangement the system further comprises a pressure release flow path interconnecting the outlet of the pyrolyser with the thermal oxidiser, the pressure release flow path having therein a pressure release means whereby, in use, if the syngas pressure in the pyrolyser exceeds a specific pressure the pressure release means will open allowing the excess gas pressure from the pyrolyser to flow into the thermal oxidiser wherein the syngas is converted into inert gas. In this manner pressure build up within the pyrolyser to a level at which syngas will escape the pyrolyser is prevented. Preferably the pressure release means comprises means for alerting an operator when the pressure release means opens thereby alerting the operator that the pressure within the pyrolyser is attempting to rise above its desired operational pressure.

Preferably the pyrolyser is arranged such that biomass and exhaust gas pass therethrough in opposite directions. In a preferred arrangement the exhaust gas enters the pyrolyser through a substantially cone shaped section and wherein the outlet for pyrolysed biomass is at the point of the cone such that as the biomass approaches the outlet the distance from the surface of the cone to the centre of the biomass across its cross section reduces. In this manner, as the biomass approaches the char outlet the heat transfer into the biomass is greater thereby increasing its temperature and ensuring that the biomass is fully pyrolised as it approached the char outlet.

According to a second aspect of the invention there is provided a method of producing clean syngas comprising: pyrolysing biomass to produce a stream of hot syngas; passing the hot syngas through a condenser to reduce its temperature until 100% tar saturation is reached; continuing to cool the syngas, in the condenser, so as to condense tar from the syngas; and re-heating the syngas, downstream of the condenser, so as to reduce the tar saturation to below 100%.

In this manner the dew point of the gassified tar content of the syngas is reduced to a temperature below the downstream temperature of the syngas such that no further tar condenses from the syngas. In this manner the syngas can be used in any manner of applications, for example it can be used to power a gas engine, in which condensation of tar would otherwise be problematic Preferably the method further includes the step of, prior to passing the hot syngas through the condenser, passing the hot syngas through a hot cyclone separator to remove dust from the hot syngas.

Preferably the method includes the step of, prior to passing the hot syngas through the condenser, passing the hot syngas through a cool cyclone separator to further remove dust from the hot syngas and to reduce the temperature of the hot syngas.

The step of passing the hot syngas through a condenser may comprise passing the hot syngas through at least one of a plurality of condensers.

Preferably the method further includes periodically performing the step of regenerating the condensers to at least partially remove tar deposited on the interior surfaces thereof. Although the condensers will be provided with drains to allow the condensed tar to drain therefrom, tar deposits will from on the interior walls of the condenser, reducing the thermal efficiency thereof. By periodically regenerating the condensers to remove any tar deposits therefrom the thermal efficiency of the condensers can be improved.

Preferably regenerating the condensers comprises turning off one of the condensers so as to prevent the cooling of the syngas passing therethrough, and circulating a portion of the hot syngas from the pyrolyser through said one of the condensers and into a burner feeding into the pyrolyser such that the hot syngas liquefies and/or gassifies at least the majority of the tar deposits within said one of the condensers. The liquefied tar will be at a higher temperature and therefore its viscosity will reduce allowing it to flow form the surface of the condensers and accumulate in the drain and any gassified tar will be recirculated back into a burner feeding the pyrolyser with hot gas.

According to a third aspect of the invention there is provided an apparatus for producing clean syngas comprising: a pyrolyser in which biomass is pyrolised to produce a stream of hot syngas; at least one condenser, downstream of said pyrolyser, through which the hot syngas passes so as to reduce its temperature until 100% tar saturation is reached thereby causing tar to condense from said syngas; and means of re-heating the syngas, downstream of the condenser, so as to reduce the tar saturation of the downstream syngas to below 100%.

Preferably the apparatus further includes a hot cyclone separator between the pyrolyser and the at least one condenser to remove dust from the hot syngas.

The apparatus may include at least one cool cyclone separator between hot cyclone separator and the condenser through which the hot syngas passes to further remove dust therefrom and to reduce the temperature of the hot syngas.

Sid at least one condenser may comprise a plurality of condensers and in a preferred arrangement the apparatus further comprises: a conduit connecting the outlet of each of said condensers to a feed line for external downstream use; a conduit connecting the outlet of each of said condensers to a feed line to a burner for heating the pyrolyser; and valve means to selectively direct syngas passing through the outlet of each of said condensers either to the feed line for external downstream use, or to the feed line to the burner for heating the pyrolyser. Preferably the apparatus comprises a cooling system for providing cooling fluid to each of said plurality of condensers, the cooling system comprising valve means for selectively controlling the flow of cooling fluid to each of said plurality of condensers. Accordingly the method of regenerating the condensers according to the second aspect of the invention can be performed by the apparatus of the third aspect of the invention.

In a preferred arrangement the apparatus further comprise a gas engine downstream of said at least one condenser and a control means to control said at least one condenser, wherein the control means controls the condenser to cool the syngas passing therethrough to a temperature below the minimum temperature the syngas will experience within the gas engine. In this manner condensation of tar within the gas engine is prevented as the syngas passing through the gas engine is maintained at a temperature above the tar dew point of the gas.

According to a forth aspect of the invention there is provided a system according to the first aspect of the invention further including the apparatus of the third aspect of the invention.

Specific embodiments of the present invention are described, by way of example, in detail below with reference to the accompanying drawings in which.

Figure 1:
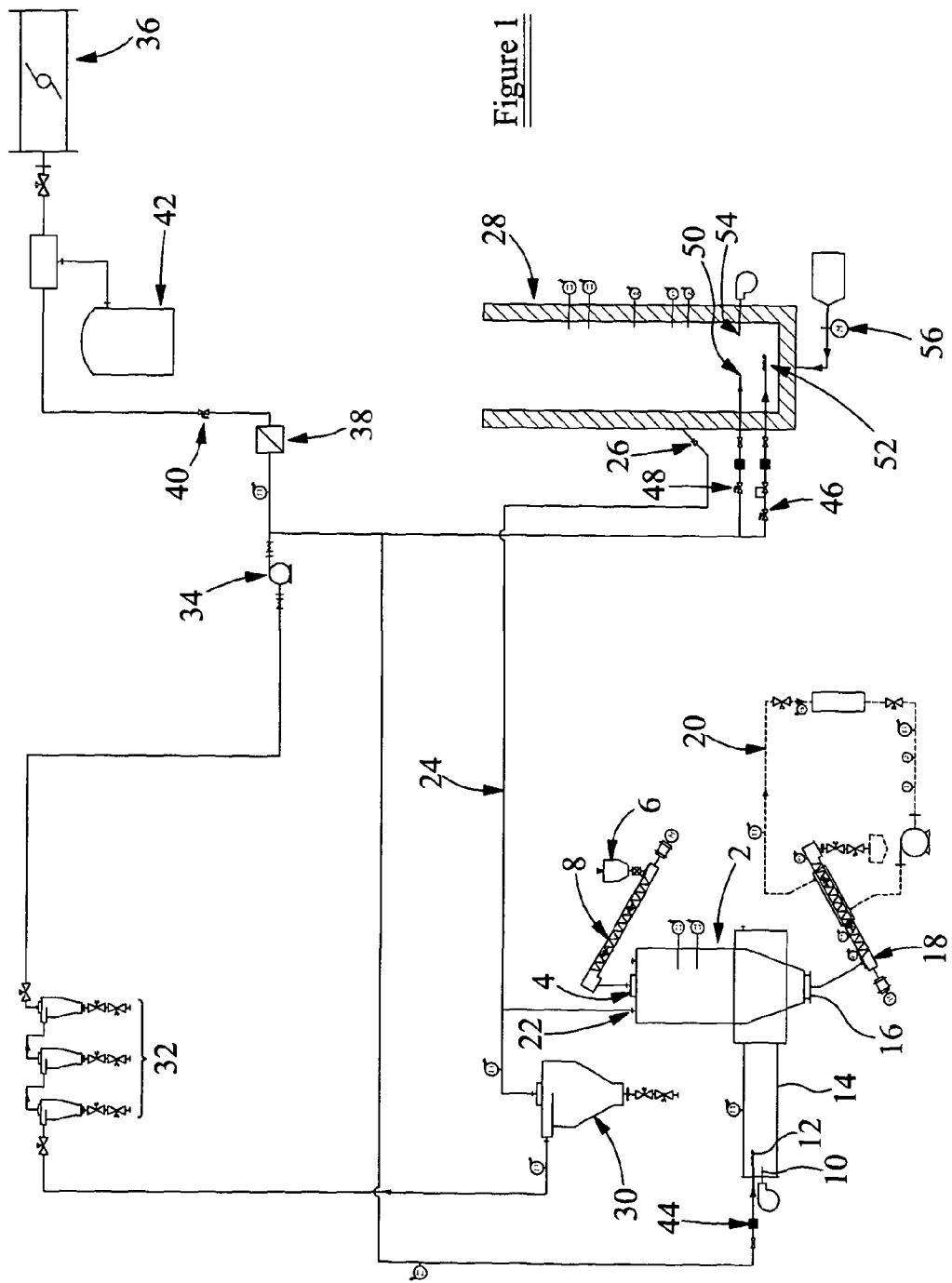
FIG. 1 shows schematic diagram of a pyrolysis system in accordance with the first aspect of the invention.

Referring to FIG. 1 a schematic diagram of a pyrolysis system is shown comprising a pyrolyser 2 having an inlet 4 through which biomass is added via hopper 6 and screw feeder 8. A lower conical area of the pyrolyser 2 is supplied with hot gas from burner 10, 12 via conduit 14. The hot exhaust gas enters the pyrolyser in the conical region at a temperature of approximately 800 degrees centigrade. One burner 10 is powered by diesel, or alternative fuel and is used on start up of the system and a second burner 12 burns syngas produced by the pyrolyser.

At the bottom of the conical area of the pyrolyser 2 is a char outlet 16 through which fully pyrolysed biomass can exit. The char then passes through a screw conveyor 18 which is cooled by a pumped water cooling system 20. When the char exits the conveyor 18 it is sufficiently cooled that it does not ignite on contact with the oxygen in the air.

The pyrolyser 2 pyrolyses the biomass and produces syngas according to known pyrolysis reactions that occur at approximately 250 to 450 degrees centigrade. The syngas exits the pyrolyser 2 through syngas outlet 22 at approximately 400 degrees centigrade. A conduit 24 having a pressure relief means joins the pyrolyser 2 to a thermal oxidiser 28. In the event that pressure in the pyrolyser 2 exceeds a desired temperature the pressure relief means 26 opens allowing excess gas within the pyrolyser to pass therethrough and become oxidised in the thermal oxidiser 28 to form inert gasses.

A conduit leads from the pyrolyser 2 to a cyclone filter 30 that performs an initial filter on the hot syngas and separates out larger dust particles or other solids entrained in the syngas flow. Downstream from the cyclone filter 30 are a series of smaller cyclone filters 32 that further filter smaller particles from the syngas. The syngas is also cooled in these filters from approximately 400 degrees centigrade to approximately 100 degrees centigrade. Before passing through a variable speed pump 34. The pump 34 is run at a speed to constantly draw off syngas from the pyrolyser 2 through the filters 30, 32. The pump 34 is operated to draw off syngas from the pyrolyser at a rate such that the pressure within the pyrolyser 2 does not exceed the surrounding atmospheric pressure. In this manner, as there is no pressure drop between the interior of the pyrolyser to the exterior of the pyrolyser the syngas produced does not need to be contained by pressure seals etc. The pump 34 may be run such that there is a slightly lower pressure in the pyrolyser than the surrounding atmospheric pressure. Further to preventing gas from seeping from the pyrolyser, ensuring a slight pressure drop between the exterior of the pyrolyser and the interior of the pyrolyser a small constant inflow of air to the pyrolyser is obtained, further preventing any danger of syngas escaping. It will be appreciated that the amount of air being drawn into the pyrolyser should not be sufficient to alter the reaction chemistry of the pyrolysis therein. Downstream of the pump 34 the syngas conduit splits into three flowpaths. The first flow path connects the pump 34 to a gas engine 36 via a fine filter 38, to filter the air to 30 .mu.m, and a valve 40. An auxiliary supply of gas 42 is also supplied which can be used on system start-up to replace or supplement the syngas until sufficient syngas is being produced by the pyrolyser to power the gas engine 36. The gas engine 36 is used to create electricity, at least some of which may be used locally to power the system.

A second flow path leads form the pump 34 to the burner 12 via a valve 44. Control of the valve 44 enables syngas to be fed into the burner 12 that creates the hot gas that powers the pyrolyser. By using the syngas produced from the pyrolysis to at least partially produce the heat needed to maintain the pyrolysis process dependence on external fuel to power the process can be minimised and in may cases restricted to start up conditions. The third flow path leads from the pump 34 to the thermal oxidiser 28. This conduit further splits into two flowpaths, each with an individual flow control valve 46, 48. Valve 48 is maintained, open during use and allows a very small flow of syngas through to pilot burner 50 and valve 46 is controlled through the process to control flow of syngas to burner 52 and enables any excess vas, not cycled back to the burner 12, or not combusted in gas engine 36, to be safely oxidised in the oxidiser. The oxidiser 28 is also provided with an independent pilot 54 that burns an auxiliary fuel and which is maintained alight during start up conditions at which time sufficient syngas may not be being produced to power the syngas pilot 50. A fan/motor 56 provides a flow of oxygen containing air into the thermal oxidiser 28. The system may be provided with various temperature, pressure and flow sensors through out to assist in maintaining and monitoring the system. The use of most of such monitoring and control systems will be apparent to someone skilled in the art. The pyrolyser has pressure sensors therein to ensure that the pressure within the pyrolyser 2 is maintained at, or below, a desired pressure and may feedback to the variable speed pump. In this manner, on start up, as the pyrolysis reaction starts to occur and the volume of syngas being produced starts to increase, the speed of the pump 34 can be automatically increased to draw off sufficient syngas from the pyrolyser 2.

Figure 2:
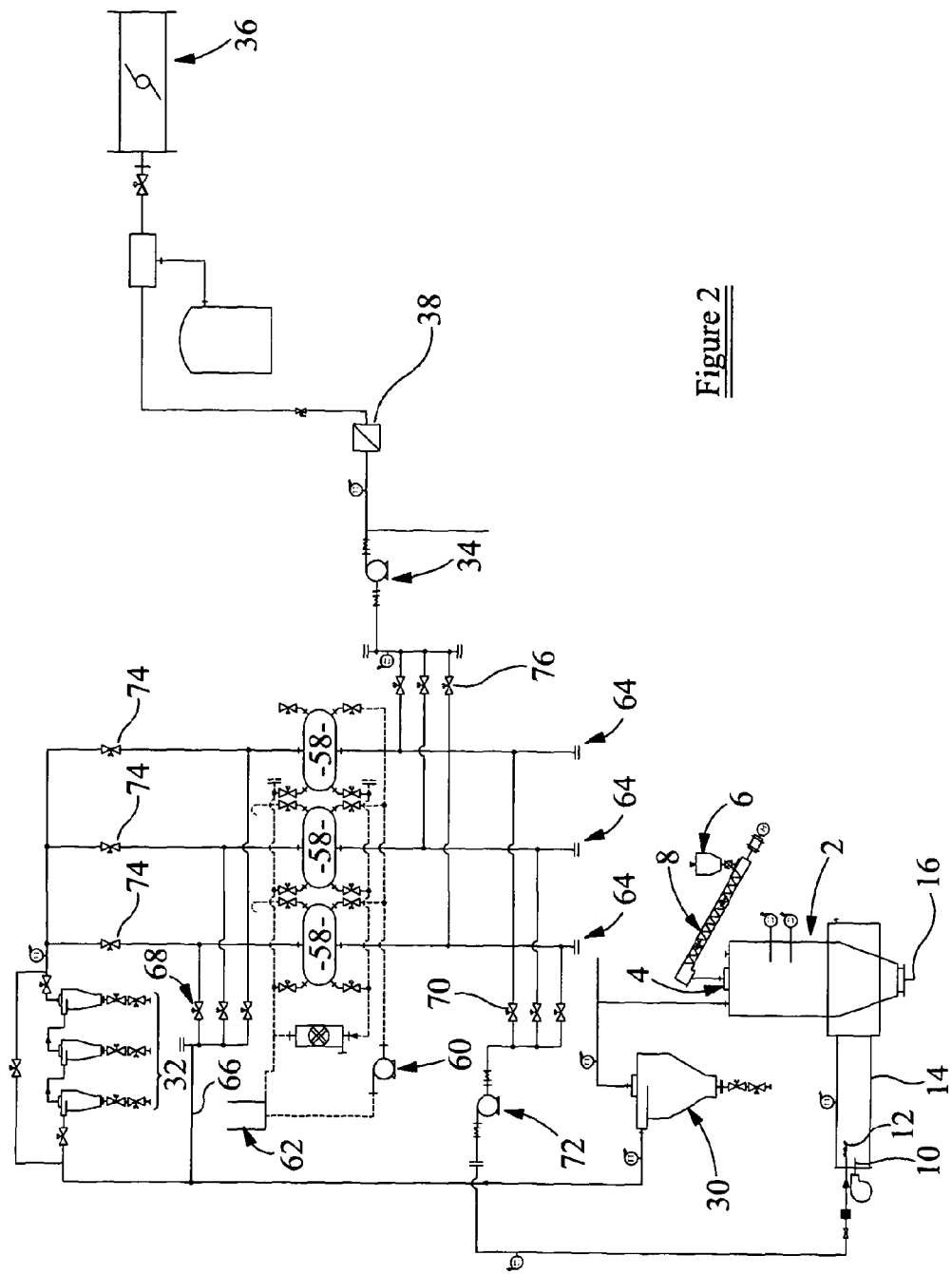
FIG. 2 shows a schematic diagram of an apparatus for producing clean syngas in accordance with the third aspect of the invention.

Referring to FIG. 2 the pyrolyser 2 and biomass feed system are the same as described in relation to FIG. 1 and a pyrolyser 2 having an inlet 4 through which biomass is added via hopper 6 and screw feeder 8. A lower conical area of the pyrolyser 2 is supplied with hot gas from burner 10, 12 via conduit 14. The hot exhaust gas enters the pyrolyser in the conical region. One burner 10 is powered by diesel, or alternative fuel and is used on start up of the system and a second burner 12 burns syngas produced by the pyrolyser. At the bottom of the conical area of the pyrolyser 2 is a char outlet 16 through which fully pyrolysed biomass can exit.

The pyrolyser 2 pyrolyses the biomass and produces syngas according to known pyrolysis reactions. The syngas exits the pyrolyser 2 through syngas outlet 22. A conduit as described in reference to FIG. 1 joins the pyrolyser 2 to a thermal oxidiser (not shown) and operates in the same way.

A conduit leads from the pyrolyser 2 to a cyclone filter 30 that performs an initial filter on the hot syngas and separates out larger dust particles or other solids entrained in the syngas flow. Downstream from the cyclone filter 30 are a series of smaller cyclone filters 32 that further filter smaller particles from the syngas. The syngas is also cooled in these filters from approximately 400 degrees centigrade to approximately 100 degrees centigrade. A filter bypass is provided to enable the filers 32 to be isolated without stopping the system which greatly improves possibilities for servicing the filters 32 without shutting down the process. Downstream of the filters 32 the flow path splits into three parallel flowpaths, each of which pass through a condenser 58. The condensers are cooled by a circulating coolant which is pumped around the system by coolant pump 60 and via expansion tank 62. The condensers cool the syngas passing therethrough and, as the syngas cools the relative tar humidity increases until, 100% tar humidity the tar starts to condense out of the syngas. As the temperature drops further the tar continues to condense out and forms liquid tar which drains from the system at tar drains 64. When the syngas exits the condensers its temperature increases, thereby reducing the relative tar humidity of the gas to below 100% thereby preventing any further tar condensing therefrom, unless the syngas temperature falls to a temperature equal to or less than the lowest temperature it experienced in the condenser 58. The exiting syngas therefore has a tar content far lower than the syngas entering the condensers and the 100% tar humidity temperature, which is dependant on the tar content, is significantly lowered. Accordingly, providing the temperature of the exiting syngas is maintained above this much lowered tar dew point no further tar will condense out of the syngas enabling it to be processed far more easily. This is especially advantageous as tar condensation within syngas engines used, for example, to convert the syngas to electrical energy are susceptible to damage and reduced life caused by tar condensates accumulating therein.

The three condenser flow paths then rejoin one another and pass through multi speed pump 34 which operates to draw syngas from the pyrolyser 2 and directs it either to a gas engine 36, via filter 38, or to a thermal oxidiser as shown in FIG. 1. The pump 36 may be controlled as described in relation to FIG. 1 to prevent pressure build up within the pyrolyser 2. Each condenser inlet and outlet flow path has a valve 74, 76 therein so that syngas can be controlled to flow through one, two or three of the condensers 58. A cooling filter bypass conduit 66 can selectively feed hot syngas from the flow path joining the filter 30 with the filters 32 directly into selective ones of the condensers 58 via valves 68; and burner feed flowpaths, each having valves 70 therein connect the condenser 58 outlets to a burner feed pump 72 to selectively feed syngas passing through the condensers into the burner 12 to create the necessary heat for the pyrolysis.

In use, selective control of valves 70, 74 and 76, together with control of pumps 34 and 72 allow syngas to be passed selectively through one or more of the condensers and then the syngas flow to be split such that some of the syngas is directed to the burner 12 to power the pyrolysis process and some of the syngas is directed to the gas engine 36 wherein it is combusted to produce energy.

In use, although the majority of the tar will drain from the condensers via tar drains 64, some tar deposits will build up on the cold interior of the condensers. This build up of tar reduces the thermal efficiency of the condensers and is not desirable. By closing valves 74 and 76, opening valves 68 and 70, and stopping cooling pump 60, hot syngas can circulate through the condensers 58 and back into the burner 12 without being cooled. This will cause the temperature of the condensers to quickly become elevated reducing the viscosity of the tar and causing a large amount of the tar that has accumulated on the cold interior of the condensers 58 to flow therefrom. Some of the tar will also become gassified and will exit the condensers 58 along with the syngas and be redirected to the burner 12. As each condenser has its own set of valves 68, 70 74, 76 associated therewith the system can operate normally using one or two condensers to remove tar from syngas being directed to the gas engine and the other condensers can have their valves switched to put them into a regeneration cycle thereby enabling the removal of tar deposits therefrom without effecting the overall operation of the system.

It will be appreciated that the embodiments described in relation to FIG. 1 and FIG. 2 may be combined to create a system having all the features of both systems. Equally it will be appreciated by the skilled person that specific features of the first or second embodiment may be incorporated into the other.

Figure 3:
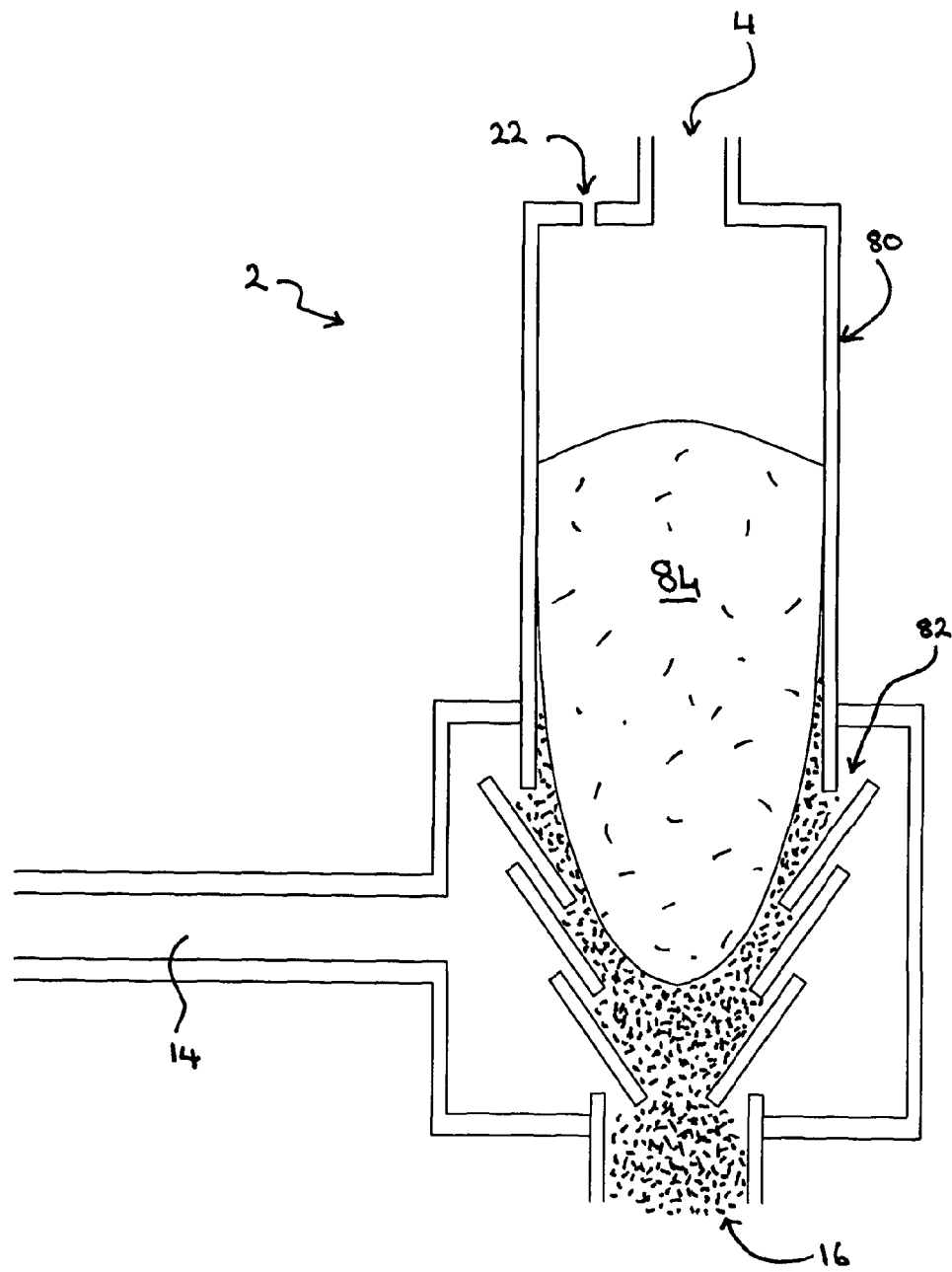
FIG. 3 shows a pyrolyser for use with the system according to the first aspect of the invention or the apparatus in accordance with the third aspect of the invention.

Referring to FIG. 3 a pyrolyser 2 is shown comprising a substantially upright vessel 80 having a conical lower section with openings 82 therein. The vessel has a biomass inlet 4 at the top through which biomass 84 can be added to the pyrolyser. Hot exhaust gas is fed into the pyrolyser via conduit 14 and passes through the openings 82 to come into direct contact with the biomass. The biomass pyrolyses around its boundary layer with the hot gas and fully pyrolysed biomass is removed from the bottom of the pyrolyser via char outlet 16. As the biomass pyrolyses it produces syngas which is drawn off from the pyrolyser via syngas outlet 22. The pyrolyser may be positioned vertically as depicted or may, alternatively be positioned at an incline. In either position, but particularly when positioned at an incline, the pyrolyser may be rotated so as to cause the biomass therein to move in a tumbling motion increasing its exposure to the hot exhaust gas.

It will be appreciated by the skilled person that in place of the pyrolyser described in reference to FIG. 3 other types of pyrolyser may be used in the systems shown in FIGS. 1 and 2, for example a horizontal rotary pyrolyser may be used which may provide a through flow from biomass introduced at one end to char expelled, or removed, from the other end.

The invention claimed is:

1. A pyrolysis system comprising:
   an entrained flow pyrolyser having: an opening through which biomass can be added; an inlet for hot exhaust gas; an outlet for pyrolysed biomass and an outlet for syngas;
   a burner for producing hot exhaust gas;
   a conduit between the burner and the hot exhaust gas inlet;
   a syngas extractor for extracting syngas from the pyrolyser; wherein:
   the syngas extractor is configured to extract syngas from the pyrolyser at a variable rate such that the internal pressure within the pyrolyser never exceeds the pressure external to the pyrolyser, and
   wherein the syngas extractor is a variable speed pump.

2. A pyrolysis system according to claim 1 further comprising:
   a flow path configured to convey a proportion of the extracted syngas to the burner such that the burner combusts said syngas produced in the pyrolyser to produce said hot exhaust gas.

3. A pyrolysis system according to claim 2 and further comprising an energy converter configured to combust syngas and convert it to electrical energy, wherein the syngas extractor comprises:
   a first variable speed pump configured to convey syngas from the pyrolyser to the burner; and
   a second variable speed pump configured to convey syngas from the pyrolyser to the energy converter.

4. A pyrolysis system according to claim 2 further comprising:
   a thermal oxidizer, in fluid communication with the syngas outlet, configured to convert any excess syngas not combusted in the burner into inert gas.

5. A pyrolysis system according to claim 4 wherein the system further comprises:
   a pressure release flow path interconnecting the outlet of the pyrolyser with the thermal oxidizer, said pressure release flow path having therein a pressure reliever configured such that, in use, if the syngas pressure in the pyrolyser exceeds a specific pressure the pressure reliever will open allowing the excess gas pressure from the pyrolyser to flow into the thermal oxidizer where the syngas is converted into inert gas.

6. A pyrolysis system according to claim 1 further comprising:
   an energy converter configured to combust syngas and convert it to electrical energy.

7. A pyrolysis system according to claim 6 wherein said energy converter is a gas engine.

8. A pyrolysis system according to claim 6 further comprising:
   a thermal oxidiser, in fluid communication with the syngas outlet, configured to convert any excess syngas not combusted in the energy converter, into inert gas.

9. A pyrolysis system according to claim 1 further comprising:
   a cooling system to cool the pyrolysed biomass to a temperature below which it will ignite upon exposure to oxygen.

10. A pyrolysis system according to claim 8 wherein the system further comprises:
    a pressure release flow path interconnecting the outlet of the pyrolyser with the thermal oxidiser, said pressure release flow path having therein a pressure reliever configured such that, in use, if the syngas pressure in the pyrolyser exceeds a specific pressure the pressure reliever will open allowing the excess gas pressure from the pyrolyser to flow into the thermal oxidiser where the syngas is converted into inert gas.

11. A pyrolysis system according to claim 1 wherein:
    the pyrolyser is arranged such that biomass and exhaust gas pass therethrough in opposite directions.

12. A pyrolysis system according to claim 11 wherein the exhaust gas enters the pyrolyser through a substantially cone shaped section and wherein the outlet for pyrolysed biomass is at the point of the cone such that as the biomass approaches the outlet the distance from the surface of the cone to the centre of the biomass reduces.

* * * * *